(12) United States Patent  
Butaud et al.

(10) Patent No.: US 8,762,486 B1  
(45) Date of Patent: Jun. 24, 2014

(54) REPLICATING USER REQUESTS TO A NETWORK SERVICE

(75) Inventors: Carter N. Butaud, Redmond, WA (US); John Santino, Bellevue, WA (US); Sukhada S. Palkar, Renton, WA (US); Steven A. Miles, Seattle, WA (US); Olivier Z. Garamfalvi, Seattle, WA (US); Kurtis J. Norwood, Seattle, WA (US); David J. Anderson, Seattle, WA (US); Kaloyan K. Kraev, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 181 days.

(21) Appl. No.: 13/247,060

(22) Filed: Sep. 28, 2011

(51) Int. Cl.
*G06F 15/16* (2006.01)

(52) U.S. Cl.
USPC .......................................................... 709/217

(58) Field of Classification Search
USPC .......................................................... 709/217
See application file for complete search history.

(56) References Cited

U.S. PATENT DOCUMENTS

| 4,771,459 | A * | 9/1988 | Jansen ........................... 380/277 |
| 6,560,564 | B2 * | 5/2003 | Scarlat et al. .................. 702/186 |
| 8,001,422 | B1 * | 8/2011 | Sun et al. ........................ 714/25 |
| 2003/0069968 | A1 * | 4/2003 | O'Neil et al. .................. 709/225 |
| 2005/0268165 | A1 * | 12/2005 | Betts et al. ....................... 714/18 |
| 2008/0097960 | A1 * | 4/2008 | Dias et al. .......................... 707/2 |

OTHER PUBLICATIONS

U.S. Appl. No. 13/247,111 entitled "Evaluating Network Service Performance by Replicating User Requests," which was filed on Sep. 28, 2011.

\* cited by examiner

*Primary Examiner* — Andrew Georgandellis
(74) *Attorney, Agent, or Firm* — Thomas | Horstemeyer, LLP

(57) ABSTRACT

Disclosed are various embodiments for replicating service requests. A service request is obtained from a client. A primary service and a secondary service are determined based at least in part on the service request and a routing configuration. The secondary service corresponds to another version of the primary service. The service request is routed to the primary service and potentially replicated to the secondary service. A service response to the service request is obtained from the primary service and then sent to the client.

26 Claims, 6 Drawing Sheets

REPLICATING USER REQUESTS TO A NETWORK SERVICE

CROSS-REFERENCE TO RELATED APPLICATION

This application is related to co-pending U.S. patent application entitled "EVALUATING NETWORK SERVICE PERFORMANCE BY REPLICATING USER REQUESTS," having application Ser. No. 13/247,111 and filed on Sep. 28, 2011, which is incorporated by reference in its entirety.

BACKGROUND

Application development is an iterative process. For applications, services, engines, etc. that are actively developed, new versions are developed to improve performance, correct defects, introduce new features, and for other reasons. In addition, the hardware and networking infrastructure that support the applications, services, engines, etc. may be replaced or modified from time to time. It is important that software and infrastructure changes be thoroughly tested for quality assurance before they are deployed for actual production use.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to replicating user requests to a network service. As used herein, the term "service" relates to a networked application that obtains a request, processes the request, and generates a response to the request. Services may be deployed for production use or testing use. It is difficult to test a change to a service, such as a change to the code that implements the service, a change to the hardware infrastructure supporting the service, and so on. Developers are left to generate "dummy" service requests manually or programmatically in order to test the changed service. However, dummy service requests are often a poor approximation of an actual stream of user-generated service requests. Therefore, the developers may switch a changed service to production use prematurely, potentially resulting in errors being surfaced to users due to heretofore undiscovered code defects, inadequate hardware infrastructure, inadequate network infrastructure, etc.

Various embodiments of the present disclosure enable developers to test changes to a service with actual user requests behind the scenes with no errors being surfaced to users. A service request routing application routes service requests to, and service responses from, a production version of a service, while transparently replicating the service requests to a testing version of the service. In one embodiment, a predefined proportion of the request traffic may be replicated, thereby facilitating proportional testing of actual user traffic using a downscaled computing resource for testing. In one embodiment, the request traffic may be stored and replayed to the testing service at a later time. In the following discussion, a general description of the system and its components is provided, followed by a discussion of the operation of the same.

Figure 1:
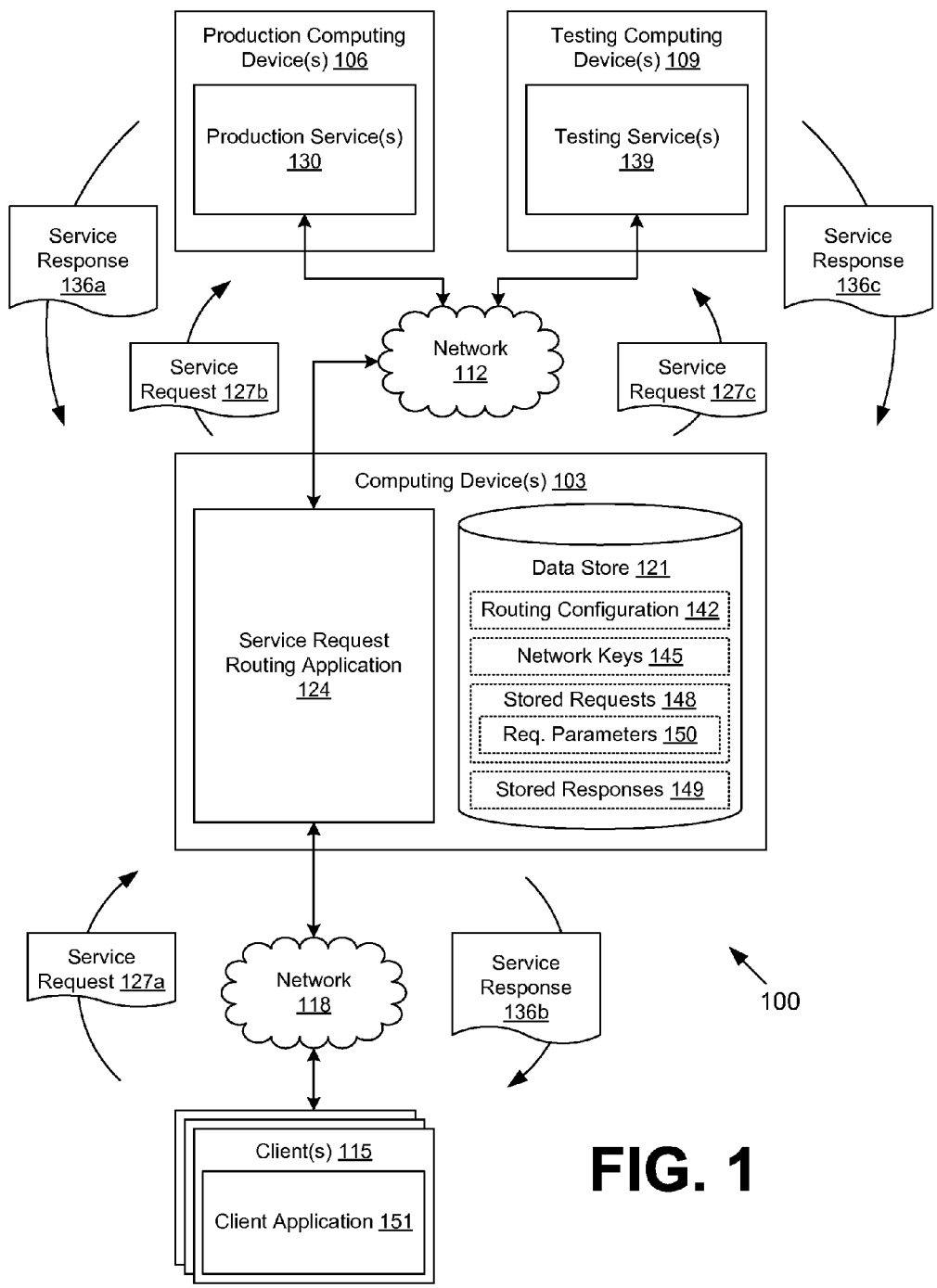
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more production computing devices 106 and one or more testing computing devices 109 by way of a network 112. The networked environment 100 also includes one or more clients 115 in data communication with the computing devices 103 by way of a network 118. The network 112, 118 includes, for example, the Internet, intranets, extranets, wide area networks (WANs), local area networks (LANs), wired networks, wireless networks, or other suitable networks, etc., or any combination of two or more such networks. In one embodiment, the networks 112 and 118 correspond to the same network. In another embodiment, the network 112 corresponds to an internal network, while the network 118 corresponds to an external network.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 121 that is accessible to the computing device 103. The data store 121 may be representative of a plurality of data stores 121 as can be appreciated. The data stored in the data store 121, for example, is associated with the operation of the various applications and/or functional entities described below.

The components executed on the computing device 103, for example, include a service request routing application 124 and other applications, services, processes, systems, engines, or functionality not discussed in detail herein. The service request routing application 124 is executed to route service requests 127a obtained from clients 115 as service requests 127b to production services 130 executed in the production computing device 106 by way of the network 112. In addition, the service request routing application 124 routes service responses 136a obtained from the production services 130 back to the clients 115 by way of the network 118 as service responses 136b. In some cases, the service request routing application 124 may be configured to replicate the service requests 127a as service requests 127c to testing services 139 executed in the testing computing devices 109 by way of the network 112. The service request routing application 124 may also obtain service responses 136c from the testing services 139, but the service responses 136c are not returned back to the clients 115. In various embodiments, the service request routing application 124 may include a proxy server application.

The data stored in the data store 121 includes, for example, a routing configuration 142, network keys 145, stored requests 148, stored responses 149, and potentially other data. The routing configuration 142 specifies how service requests 127a are to be routed. For example, the service request routing application 124 may provide routing for many different services. The routing configuration 142 may specify domain names, query strings, and/or other criteria by which service requests 127a are to be routed to either production services 130 or testing services 139. Further, the routing configuration 142 may specify whether the service requests 127a are to be replicated to the testing services 139 and whether the service requests 127a are to be stored.

The network keys 145 are employed to create secured channels of communication to the client 115, the production computing devices 106, and/or the testing computing devices 109. For example, the service request routing application 124 may employ different encrypted channels to communicate with the client 115, the production services 130, and/or the testing services 139. The network keys 145 may pertain to transport layer security (TLS), secured sockets layer (SSL), and/or other forms of network-based encryption.

The stored requests 148 correspond to service requests 127a that may be stored and available for later replay to the testing services 139. In some cases, only a predefined proportion of the service requests 127a may be stored as stored requests 148. The stored requests 148 may be selectable according to various request parameters 150 such as, for example, session identifiers, user identifiers, geographic location of the client 115, and/or other parameters. The stored responses 149 may correspond to stored versions of the service responses 136a from the production services 130 and/or stored versions of the service responses 136c from the testing services 139. The stored responses 149 may correspond to all of the service responses 136a, 136c that are obtained by the service request routing application 124 or a portion thereof.

The production computing device 106 may comprise, for example, a server computer or any other system providing computing capability. Alternatively, a plurality of production computing devices 106 may be employed that are arranged, for example, in one or more server banks or computer banks or other arrangements. For example, a plurality of production computing devices 106 together may comprise a cloud computing resource, a grid computing resource, and/or any other distributed computing arrangement. Such production computing devices 106 may be located in a single installation or may be distributed among many different geographical locations. For purposes of convenience, the production computing device 106 is referred to herein in the singular. Even though the production computing device 106 is referred to in the singular, it is understood that a plurality of production computing devices 106 may be employed in the various arrangements as described above.

Various applications and/or other functionality may be executed in the production computing device 106 according to various embodiments. Also, various data may be stored in a data store that is accessible to the production computing device 106. The components executed on the production computing device 106, for example, include one or more production services 130 and other applications, services, processes, systems, engines, or functionality not discussed in detail herein. The production service 130 corresponds to a network service that is in production use. The production service 130 obtains service requests 127b from the service request routing application 124 and generates service responses 136a which are returned to the service request routing application 124. In one embodiment, the production service 130 corresponds to a web service that communicates using hypertext transfer protocol (HTTP), simple object access protocol (SOAP), and/or other protocols. The production service 130 may generate a service response 136a that includes hypertext markup language (HTML), extensible markup language (XML), JavaScript object notation (JSON), and/or other data.

The testing computing device 109 may comprise, for example, a server computer or any other system providing computing capability. Alternatively, a plurality of testing computing devices 109 may be employed that are arranged, for example, in one or more server banks or computer banks or other arrangements. For example, a plurality of testing computing devices 109 together may comprise a cloud computing resource, a grid computing resource, and/or any other distributed computing arrangement. Such testing computing devices 109 may be located in a single installation or may be distributed among many different geographical locations. For purposes of convenience, the testing computing device 109 is referred to herein in the singular. Even though the testing computing device 109 is referred to in the singular, it is understood that a plurality of testing computing devices 109 may be employed in the various arrangements as described above.

Various applications and/or other functionality may be executed in the testing computing device 109 according to various embodiments. Also, various data may be stored in a data store that is accessible to the testing computing device 109. The components executed on the testing computing device 109, for example, include one or more testing services 139 and other applications, services, processes, systems, engines, or functionality not discussed in detail herein. The testing service 139 corresponds to a network service that is currently being tested.

In one embodiment, the testing service 139 represents a modified or further developed version of the production service 130. For example, the testing service 139 may include additional features, performance enhancements, bug fixes, and so on compared to the production service 130. In one embodiment, the testing service 139 corresponds to a web service that communicates using HTTP, SOAP, and/or other protocols. The testing service 139 may generate a service response that includes HTML, XML, JSON, and/or other data.

Although the production computing devices 106 are described separately from the testing computing devices 109, it is understood that the production services 130 and the testing services 139 may be executed by the same production computing devices 106 in some embodiments. Also, in some embodiments, the testing computing devices 109 may correspond to a fraction of the computing resources provided by the production computing devices 106. It is noted that both the production computing devices 106 and the testing computing devices 109 may execute multiple different network services concurrently.

The client 115 is representative of a plurality of client devices that may be coupled to the network 118. The client 115 may comprise, for example, a processor-based system such as a computer system. Such a computer system may be embodied in the form of a server computer, a desktop computer, a laptop computer, personal digital assistants, cellular telephones, smartphones, set-top boxes, music players, web pads, tablet computer systems, game consoles, electronic book readers, or other devices with like capability. The client 115 may include a display comprising, for example, one or more devices such as cathode ray tubes (CRTs), liquid crystal display (LCD) screens, gas plasma-based flat panel displays, LCD projectors, or other types of display devices, etc.

The client 115 may be configured to execute various applications such as a client application 151 and/or other applications. In one embodiment, the client application 151 may correspond to a browser that is executed, for example, to access and render network pages, such as web pages, or other network content served up by the computing device 103 and/or other servers. In another embodiment, the client application 151 may correspond to a service client and another application that communicates with the service client by way of an application programming interface (API). The client 115 may be configured to execute applications beyond the client application 151 such as, for example, mobile applications, email applications, instant message applications, and/or other applications.

Next, a general description of the operation of the various components of the networked environment 100 is provided. To begin, a testing service 139 corresponding to a further developed version of a production service 130 is deployed in a testing environment with one or more testing computing devices 109 being provisioned. The production service 130 is currently deployed by one or more production computing devices 106 and remains in production throughout the testing phase.

Users at clients 115 generate service requests 127a using client applications 151. As an example, a user may request a network page, such as a web page or other form of network content, through a browser. As another example, a user may use a mobile application which requests network data in a service request 127a. Instead of being sent directly to the production service 130, the service request 127a is sent to the service request routing application 124. The service request routing application 124 may correspond to a proxy server application that routes the service request 127a to the production service 130 as the service request 127b, and the service response 136a to the client 115 as the service response 136b.

As a non-limiting example, the client 115 may originate service request 127a that is an HTTP get request for the uniform resource identifier (URI) "http://network.site/?serviceID=256&param1=value1&param2=value2." The service request routing application 124 may parse the URI to determine, based at least in part on the routing configuration 142, that the service request 127a is to be routed to a production service 130 that has an identifier of "256." In other words, a "serviceID" parameter in the URI indicates the production service 130 to which the service request 127a is to be directed. In other cases, such a parameter may depend on other information associated with the service request 127a such as, for example, port number, user agent, referrer, domain name, etc.

If so configured in the routing configuration 142, the service request routing application 124 may replicate or clone the service request 127a as a service request 127c to be sent to a testing service 139. In some configurations, only a predefined proportion of the service requests 127a are cloned as service requests 127c. Consequently, the computing capacity required to test the testing service 139 may be proportionally reduced as compared with the computing capacity to support the production service 130. This may facilitate a determination of how much computing capacity will be needed to run the testing service 139 once it is deployed as a production service 130. As a non-limiting example, testing computing devices 109 may be deployed with 20% of the capacity of the production computing devices 106, but the service request routing application 124 may be configured to route only 20% of the service requests 127a to the testing computing devices 109.

Various rules may define how much request traffic is replicated and at what times. Parameters associated with the service requests 127a may be used as input to the rules. As a non-limiting example, a developer may want request traffic that is identified as from a particular geographic area to be replicated but not request traffic from other areas. As another non-limiting example, a developer may want request traffic originating from a particular browser application to be replicated but not request traffic from other browser applications. In one embodiment, the service request routing application 124 may replicate requests until it detects that the testing service 139 is saturated with requests.

Regardless of whether a service request 127a is replicated to a testing service 139, only a service response 136a generated by the production service 130 is returned back to the client 115 by the service request routing application 124. Thus, the testing service 139 may be tested transparently to the end user. The service responses 136a may be stored in the stored responses 149. In some cases, a service response 136c from the testing service 139 may be obtained by the service request routing application 124 and stored for developer evaluation purposes in the stored responses 149. For example, the stored responses 149 may be used for smoke testing, validation testing, and/or other forms of testing. In one embodiment, the service request routing application 124 is configured to assess the performance of a testing service 139 relative to the performance of a production service 130.

Although the testing service 139 may be tested in real-time in response to receiving service requests 127a from users, the testing service 139 may also be tested at a later time. The service requests 127a, or a predefined proportion or sample of the service requests 127a, may be stored as stored requests 148 in the data store 121. The stored requests 148 may then later be played back to the testing service 139 to simulate user requests as if they were arriving in a stream. To this end, a timestamp may be associated with each stored request 148 for sequencing and to ensure a commensurate time interval between the stored requests 148 that are being replayed to the testing service 139. Various other request parameters 150 such as a sequence number, session identifier, customer identifier, and so on may be employed to select a portion of the stored requests 148 to be replayed to the testing services 139.

In some embodiments, the service request routing application 124 may be configured to use different network keys 145 for communicating with the client application 151, the production service 130, and the testing service 139. To this end, the service request routing application 124 may maintain three separate secured connections performing encryption using the different network keys 145. In like manner, the service request routing application 124 may be configured to translate between different session identifiers and other parameters that may be provided by the production service 130 and the testing service 139. For example, when the client application 151 provides in a service request 127a a session identifier that was generated by the production service 130, the service request routing application 124 may replace that session identifier in the replicated service request 127c with one generated by the testing service 139.

In many situations, the production service 130 and the testing service 139 may be stateless services, meaning that they do not modify a state in response to service requests 127. However, the production service 130 and/or the testing service 139 may sometimes be stateful services that do make changes to a state in response to service requests 127. In such cases, the testing service 139 may be configured to maintain a separate state from the production service 130. To the extent that data objects are modified by the production service 130 and the testing service 139, the testing service 139 may be configured to use a copy of the data object as modified by the production service 130 before the current service request 127b was processed.

It is noted that various stateful services may be supported on a case-by-case basis, with the production services 130 and testing services 139 possibly using respective copies of data objects. For instance, the service request routing application 124 may maintain a client state for the testing service 139 because the service responses from the testing service 139 never reach the client 115. Instead, the service request routing application 124 may modify the service request 127c to reflect the special client state corresponding to the testing service 139.

Figure 2A:
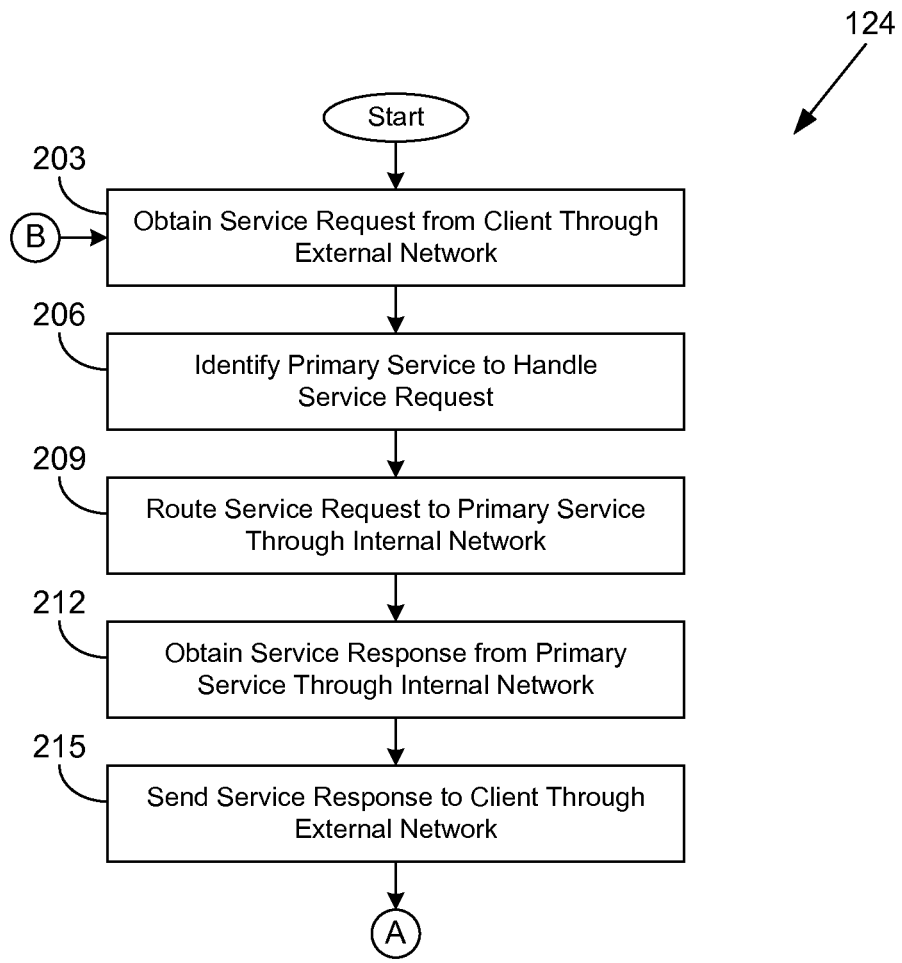
FIGS. 2A, 2B, and 3 depict flowcharts illustrating examples of functionality implemented as portions of a service request routing application executed in a computing device in the networked environment of FIG. 1 according to various embodiments of the present disclosure.
Figure 2B:
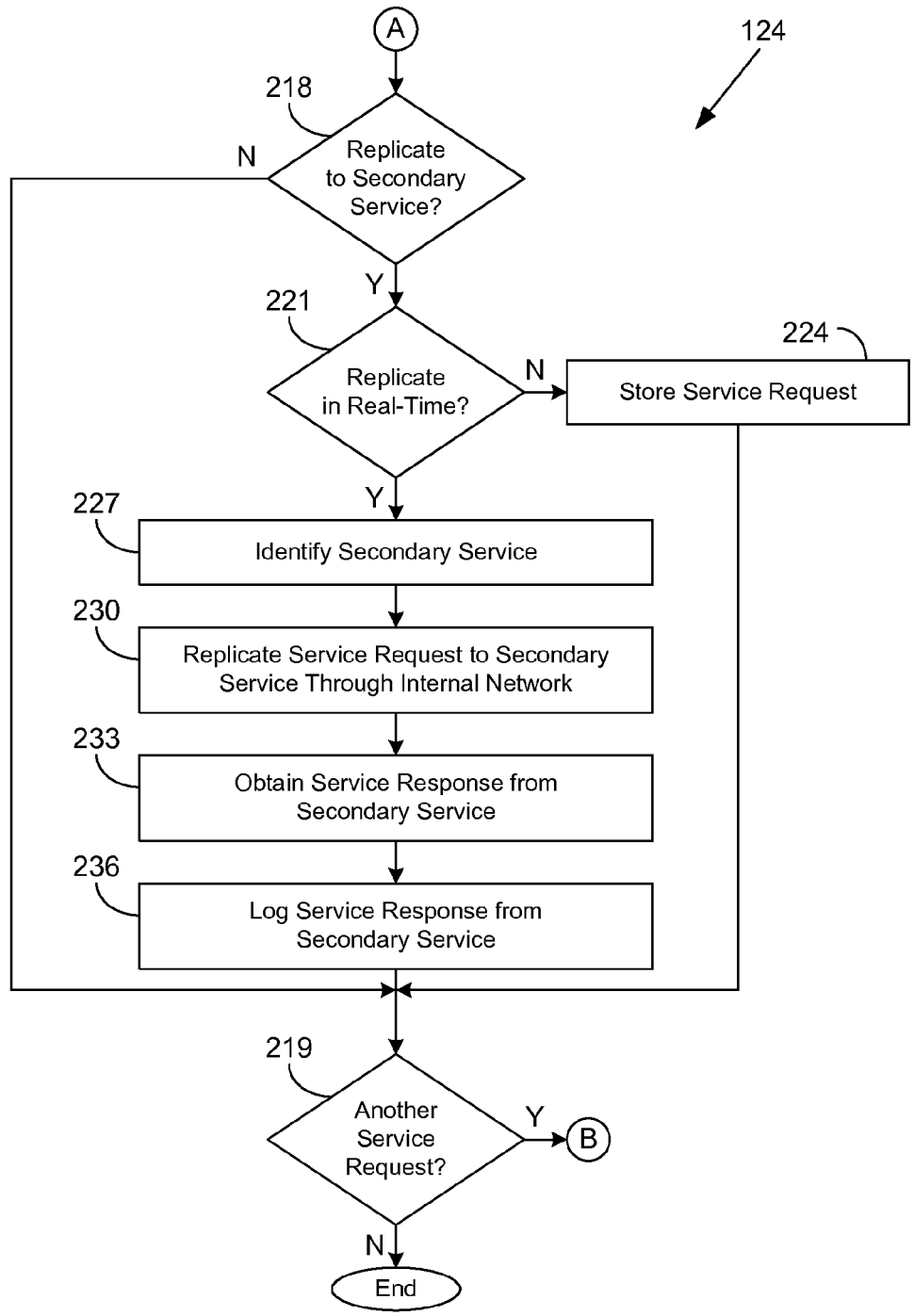

Referring next to FIGS. 2A and 2B, shown is a flowchart that provides one example of the operation of a portion of the service request routing application 124 according to various embodiments. It is understood that the flowchart of FIGS. 2A and 2B provides merely an example of the many different types of functional arrangements that may be employed to implement the operation of the portion of the service request routing application 124 as described herein. As an alternative, the flowchart of FIGS. 2A and 2B may be viewed as depicting an example of steps of a method implemented in the computing device 103 (FIG. 1) according to one or more embodiments.

Beginning with box 203 of FIG. 2A, the service request routing application 124 obtains a service request 127a (FIG. 1) from the client 115 (FIG. 1) through an external network 118 (FIG. 1). In box 206, the service request routing application 124 identifies the production service 130 (FIG. 1) which is the primary service to handle the service request 127a. In box 209, the service request routing application 124 routes the service request 127a as the service request 127b (FIG. 1) to the production service 130 through the internal network 112 (FIG. 1). In box 212, the service request routing application 124 obtains a service response 136a (FIG. 1) from the production service 130 through the internal network 112. In box 215, the service request routing application 124 sends the service response 136a as the service response 136b (FIG. 1) to the client 115 through the external network 118. The service request routing application 124 may also store the service response 136a in the stored responses 149 (FIG. 1).

Next, in box 218 of FIG. 2B, the service request routing application 124 determines whether the service request 127a is to be replicated to a testing service 139 (FIG. 1) which is a secondary service. For example, replication may be enabled or disabled in the routing configuration 142 (FIG. 1). In addition, if replication is enabled, it may be that only a predefined proportion of the service requests 127a are to be replicated, and the current service request 127a may or may not be included in the replicated proportion. If the service request 127a is not to be replicated, the service request routing application 124 proceeds to box 219 and determines whether another service request 127a is to be processed. If another service request 127a is to be processed, the service request routing application 124 returns to box 203 of FIG. 2A and obtains the next service request 127a. Otherwise, the portion of the service request routing application 124 ends.

If the service request routing application 124 instead determines in box 218 of FIG. 2B that the service request 127a is to be replicated, the service request routing application 124 proceeds to box 221. In box 221, the service request routing application 124 determines whether the service request 127a is to be replicated in real-time, potentially in parallel with the routing of the service request 127b to the production service 130. If the service request routing application 124 determines that the service request 127a is not to be replicated in real-time, the service request routing application 124 continues to box 224 and stores the service request 127a in the stored requests 148 (FIG. 1). Alternatively, the service request routing application 124 may be configured to store all service requests 127 for potential future replication. Subsequently, the service request routing application 124 proceeds to box 219 and determines whether another service request 127a is to be processed. If another service request 127a is to be processed, the service request routing application 124 returns to box 203 of FIG. 2A and obtains the next service request 127a. Otherwise, the portion of the service request routing application 124 ends.

If the service request routing application 124 instead determines in box 221 of FIG. 2B that the service request 127a is to be replicated in real-time, the service request routing application 124 proceeds to box 227. In box 227, the service request routing application 124 identifies the testing service 139 which is the secondary service associated with the production service 130. In box 230, the service request routing application 124 replicates the service request 127a as the service request 127c (FIG. 1) to the testing service 139 through the internal network 112.

In box 233, the service request routing application 124 may obtain a service response from the testing service 139. In box 236, if a service response were obtained, the service request routing application 124 may log and/or store the service response 136c (FIG. 1) from the testing service 139 in the stored responses 149. It is noted that no service response 136c from the testing service 139 is returned to the client 115. In some embodiments, the service request routing application 124 may be configured to compare values in the service response 136a with values in the service response 136c. Log entries, alarms, and/or other notifications may be generated responsive to this comparison. Subsequently, the service request routing application 124 proceeds to box 219 and determines whether another service request 127a is to be processed. If another service request 127a is to be processed, the service request routing application 124 returns to box 203 of FIG. 2A and obtains the next service request 127a. Otherwise, the portion of the service request routing application 124 ends.

Figure 3:
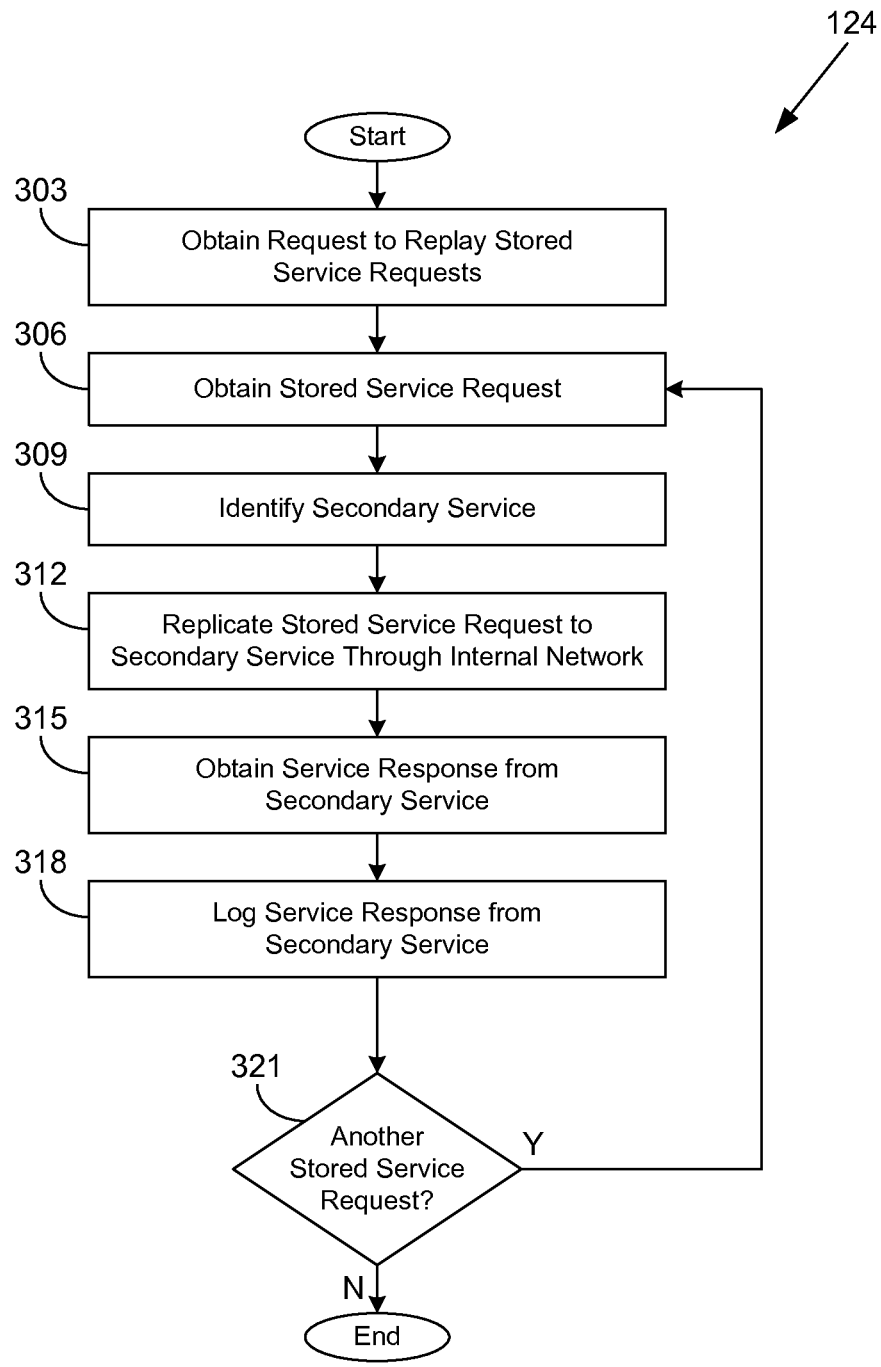

Turning now to FIG. 3, shown is a flowchart that provides one example of the operation of another portion of the service request routing application 124 according to various embodiments. It is understood that the flowchart of FIG. 3 provides merely an example of the many different types of functional arrangements that may be employed to implement the operation of the other portion of the service request routing application 124 as described herein. As an alternative, the flowchart of FIG. 3 may be viewed as depicting an example of steps of a method implemented in the computing device 103 (FIG. 1) according to one or more embodiments.

Beginning with box 303, the service request routing application 124 obtains a request to replay stored service requests 127a (FIG. 1). In box 306, the service request routing application 124 obtains a stored service request 127a from the stored requests 148 (FIG. 1) in the data store 121 (FIG. 1). In box 309, the service request routing application 124 identifies the testing service 139 (FIG. 1) corresponding to the secondary service to which the service request 127a is to be replicated.

In box 312, the service request routing application 124 replicates the stored service request 127a to the testing service 139 as a service request 127c (FIG. 1) through the internal network 112 (FIG. 1). In some scenarios, only a predefined proportion of the stored requests 148 or a portion selectable based at least in part on the request parameters 150 (FIG. 1) is replicated. Also, to replay the service requests 127a, the service request routing application 124 may utilize a timestamp associated with each service request 127a for sequencing and to approximate the time intervals between service requests 127a.

In box 315, the service request routing application 124 may obtain a service response from the testing service 139. In box 318, the service request routing application 124 may log the service response. In box 321, the service request routing application 124 determines whether another stored service request 127a remains to be processed. If another stored service request remains to be processed, the service request routing application 124 returns to box 306 and obtains another stored service request 127a. If no other stored service requests 127a remain to be processed, the portion of the service request routing application 124 ends.

Figure 4:
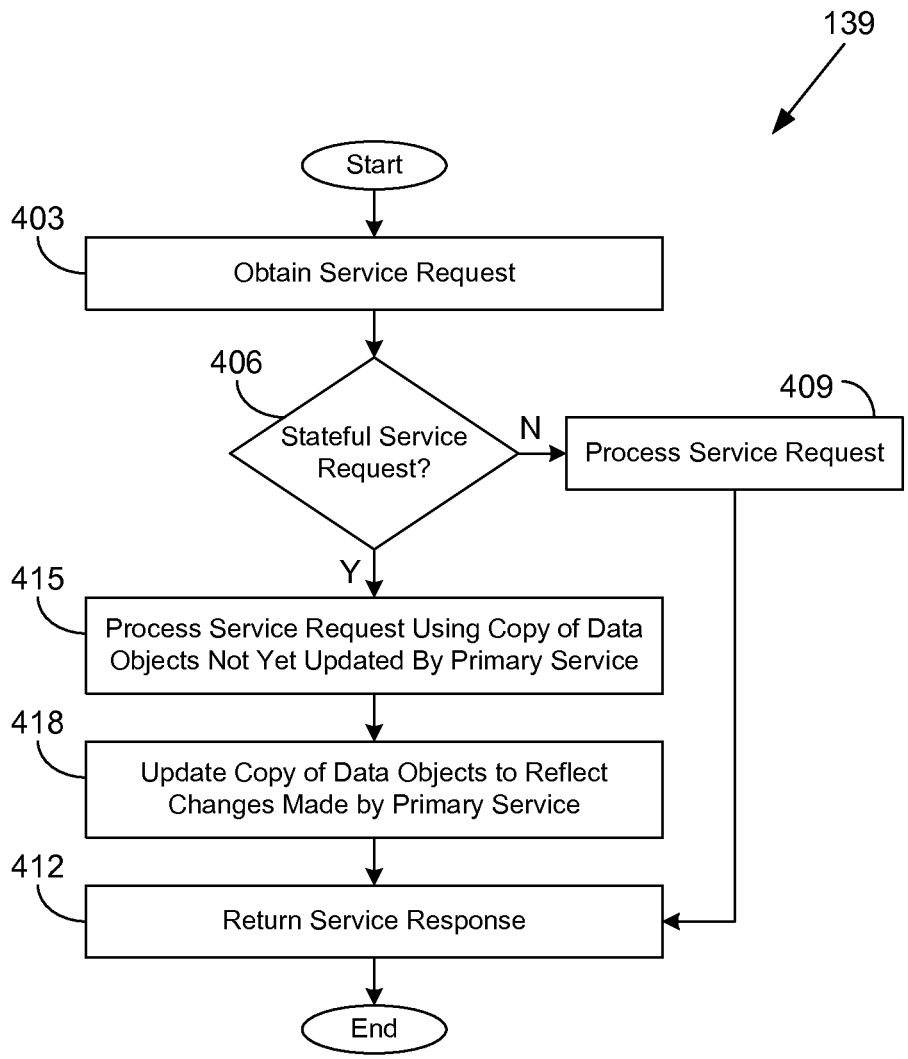
FIG. 4 is a flowchart illustrating one example of functionality implemented as portions of a service executed in a computing device in the networked environment of FIG. 1 according to various embodiments of the present disclosure.

Moving on to FIG. 4, shown is a flowchart that provides one example of the operation of a portion of the testing service 139 according to various embodiments. It is understood that the flowchart of FIG. 4 provides merely an example of the many different types of functional arrangements that may be employed to implement the operation of the portion of the testing service 139 as described herein. As an alternative, the flowchart of FIG. 4 may be viewed as depicting an example of steps of a method implemented in the testing computing device 109 (FIG. 1) according to one or more embodiments.

Beginning with box 403, the testing service 139 obtains a service request 127c (FIG. 1) from the service request routing application 124 (FIG. 1). In box 406, the testing service 139 determines whether the service request 127c is a stateful service request 127. If the service request 127c is determined not to be a stateful service request 127 (i.e., the request is a stateless service request 127), the testing service 139 moves to box 409 and processes the service request 127c. In box 412, the testing service 139 returns a service response to the service request routing application 124. Thereafter, the portion of the testing service 139 ends.

If, instead, the testing service 139 determines in box 406 that the service request 127c is a stateful service request 127, the testing service 139 continues from box 406 to box 415 and processes the service request 127c using a copy of one or more data objects. The copy is not yet updated in response to the service request 127b (FIG. 1) by a production service 130 (FIG. 1) that is the corresponding primary service of the testing service 139. In box 418, the testing service 139 updates a copy of the data objects to reflect any state changes made by the production service 130. In other words, in one embodiment involving processing of stateful service requests 127c, only the production service 130 makes changes to stored states. In box 412, the testing service 139 may return a service response to the service request routing application 124. Thereafter, the portion of the testing service 139 ends.

Figure 5:
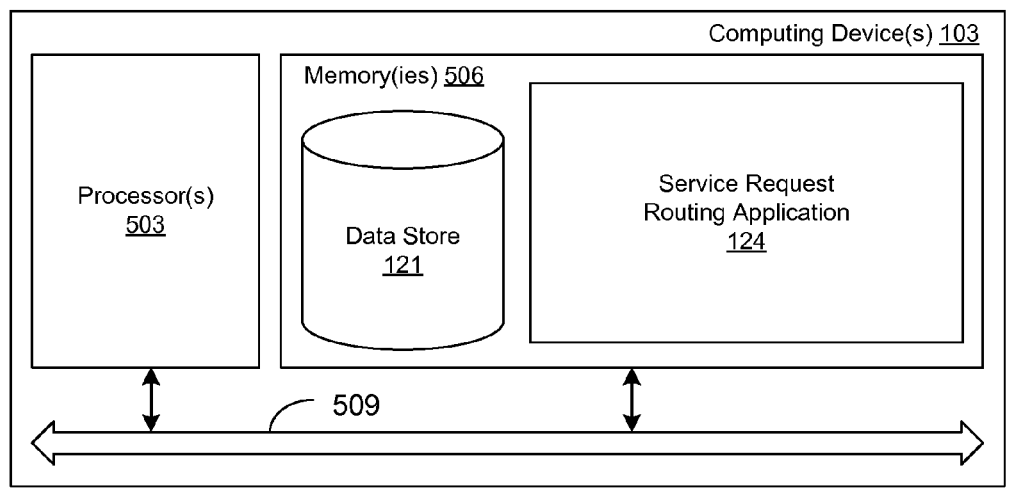
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the service request routing application 124 and potentially other applications. Also stored in the memory 506 may be a data store 121 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the service request routing application 124, the production service 130 (FIG. 1), the testing service 139 (FIG. 1), the client application 151 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2A-4 show the functionality and operation of an implementation of portions of the service request routing application 124 and the testing service 139. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2A-4 show a specific order of execution, it is understood that the order of execution may differ from that which is depicted. For example, the order of execution of two or more blocks may be scrambled relative to the order shown. Also, two or more blocks shown in succession in FIGS. 2A-4 may be executed concurrently or with partial concurrence. Further, in some embodiments, one or more of the blocks shown in FIGS. 2A-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the service request routing application 124, the production service 130, the testing service 139, and the client application 151, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
   code that obtains a service request from a client through an external network;
   code that identifies one of a plurality of primary services based at least in part on the service request and a routing configuration;
   code that routes the service request to the one of the primary services through an internal network;
   code that obtains a service response to the service request from the one of the primary services through the internal network;
   code that sends the service response to the client through the external network;
   code that identifies a secondary service that is associated with the one of the primary services, the secondary service representing a further developed version of the one of the primary services;
   code that determines whether the service request is to be replicated to the secondary service based at least in part on whether the service request is a stateful service request;
   code that stores the service request;
   code that replicates the service request that has been stored to the secondary service through the internal network in response to obtaining a request to replay the service request when the service request is to be replicated; and
   code that obtains another service response to the service request from the secondary service through the internal network.

2. The non-transitory computer-readable medium of claim 1, wherein the program further comprises code that assesses a performance of the secondary service relative to a performance of the one of the primary services.

3. A system, comprising:
   at least one computing device; and
   a service request routing application that is executed in the at least one computing device, the service request routing application comprising:
   logic that obtains a service request from a client;
   logic that determines a primary service and a secondary service based at least in part on the service request and a routing configuration, wherein the secondary service corresponds to another version of the primary service;
   logic that routes the service request to the primary service;
   logic that determines whether to replicate the service request to the secondary service based at least in part on whether the service request is a stateful service request;
   logic that replicates the service request to the secondary service in response to determining that the service request is to be replicated to the secondary service;
   logic that obtains a service response to the service request from the primary service;
   logic that sends the service response to the client; and
   wherein the service request routing application is configured to communicate with the client through a first secured channel, with the primary service through a second secured channel, and with the secondary service through a third secured channel, wherein the first secured channel, the second secured channel and the third secured channel employ different security parameters from one another.

4. The system of claim 3, wherein the logic that determines the primary service and the secondary service is further configured to select the primary service from a plurality of different primary services based at least in part on at least a portion of a uniform resource identifier (URI) of the service request.

5. The system of claim 4, wherein the portion of the URI is selected from the group consisting of: a domain name, a port number, and a query string.

6. The system of claim 3, wherein the logic that determines whether to replicate the service request is configured to determine whether to replicate the service request further based at least in part on a predefined proportion of service requests to the primary service that are to be replicated to the secondary service.

7. The system of claim 3, wherein the logic that determines whether to replicate the service request is configured to determine whether to replicate the service request further based at least in part on a parameter associated with the service request.

8. The system of claim 7, wherein the parameter is selected from the group consisting of: a session identifier and a user identifier.

9. The system of claim 3, wherein the logic that replicates the service request is further configured to replicate the service request to the secondary service in parallel while the service request is routed to the primary service.

10. The system of claim 3, wherein the logic that replicates the service request is further configured to store the service request and to replicate the service request to the secondary service in response to obtaining a request to replicate a plurality of stored service requests to the secondary service.

11. The system of claim 3, wherein the primary service corresponds to a production version of a service, and the secondary service corresponds to a testing version of the service.

12. The system of claim 3, wherein the service request routing application further comprises logic that stores the service response.

13. The system of claim 3, wherein the service request routing application further comprises logic that obtains another service response to the service request from the secondary service, wherein the other service response is not sent to the client.

14. The system of claim 13, wherein the service request routing application further comprises logic that records a performance of the secondary service in generating the other service response.

15. The system of claim 3, wherein the service request comprises a request for a network page, and the service response comprises the network page.

16. The system of claim 3, wherein the service request routing application includes a proxy server application.

17. The system of claim 3, wherein the primary service and the secondary service are executed in different computing device configurations.

18. The system of claim 3, wherein the service request routing application is configured to communicate with the primary service and the secondary service through an internal network and to communicate with the client through an external network.

19. The system of claim 3, wherein the primary service is configured to read from and write to a first copy of a data object in processing the service request, the secondary service is configured to read from a second copy of the data object in processing the service request, and the secondary service is configured to update the second copy of the data object with the first copy of the data object after processing the service request.

20. A method, comprising:
   obtaining, in at least one computing device, a service request from a client;
   identifying, in the at least one computing device, a first service from a plurality of services based at least in part on the service request and a routing configuration;
   routing, in the at least one computing device, the service request to the first service;
   obtaining, in the at least one computing device, a service response to the service request from the first service;
   sending, in the at least one computing device, the service response to the client;
   identifying, in the at least one computing device, a second service that is associated with the first service, the second service representing a further developed version of the first service;
   determining, in the at least one computing device, whether the service request is to be replicated based at least in part on whether the service request is a stateful service request; and
   replicating, in the at least one computing device, the service request to the second service based at least in part on the determining whether the service request is to be replicated.

21. The method of claim 20, wherein determining, in the at least one computing device, whether to replicate the service request to the second service is further based at least in part on a predefined proportion of service requests to the first service that are to be routed to the second service.

22. The method of claim 20, further comprising-obtaining, in the at least one computing device, another service response to the service request from the second service, wherein the other service response is not sent to the client.

23. The method of claim 20, wherein replicating-further comprises:
- storing, in the at least one computing device, the service request;
- obtaining, in the at least one computing device, a request to replay the service request; and
- sending, in the at least one computing device, the service request that has been stored to the second service in response to the request to replay the service request, the service request being sent relative to a plurality of other stored service requests based at least in part on a time of receipt associated with the service request.

24. The method of claim 23, wherein the request to replay the service request indicates at least one parameter for selecting the service request, and sending the service request is performed responsive to the service request being selected based at least in part on the at least one parameter.

25. The method of claim 20, further comprising assessing a performance of the second service relative to a performance of the first service.

26. The method of claim 20, wherein the first service is configured to read from and write to a first copy of a data object in processing the service request, the second service is configured to read from a second copy of the data object in processing the service request, and the second service is configured to update the second copy of the data object with the first copy of the data object after processing the service request.

* * * * *

UNITED STATES PATENT AND TRADEMARK OFFICE
CERTIFICATE OF CORRECTION

PATENT NO. : 8,762,486 B1
APPLICATION NO. : 13/247060
DATED : June 24, 2014
INVENTOR(S) : Carter N. Butaud et al.

Page 1 of 1

It is certified that error appears in the above-identified patent and that said Letters Patent is hereby corrected as shown below:

In the Claims

Claim 22, Column 14, line 64: replace "comprising-obtaining," with -- comprising obtaining, --

Claim 23, Column 15, line 1: replace "replicating-further" with -- replicating further --

Signed and Sealed this
Thirty-first Day of March, 2015

Michelle K. Lee
*Director of the United States Patent and Trademark Office*